US009892689B2

(12) United States Patent
Kang et al.

(10) Patent No.: US 9,892,689 B2
(45) Date of Patent: Feb. 13, 2018

(54) DISPLAY DEVICE AND METHOD FOR REDUCING POWER CONSUMPTION THROUGH BACKLIGHT CONTROL OF ON AND OFF LIGHT SOURCE REGIONS

(71) Applicant: SAMSUNG ELECTRONICS CO., LTD., Suwon-si (KR)

(72) Inventors: Kun Sok Kang, Yongin-si (KR); Hak Sup Song, Suwon-si (KR); Sang Il Lee, Seongnam-si (KR); Joo Whan Lee, Seongnam-si (KR); Seong Seol Hong, Yongin-si (KR); Soo Yong Lee, Daejeon (KR); Mi Jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 14/502,059

(22) Filed: Sep. 30, 2014

(65) Prior Publication Data
US 2015/0091795 A1 Apr. 2, 2015

(30) Foreign Application Priority Data

Sep. 30, 2013 (KR) ........................ 10-2013-0115971

(51) Int. Cl.
*G09G 3/34* (2006.01)
*G06F 3/01* (2006.01)
(Continued)

(52) U.S. Cl.
CPC ............ *G09G 3/3406* (2013.01); *G06F 3/011* (2013.01); *G09G 2354/00* (2013.01); *G10L 15/00* (2013.01); *G10L 17/00* (2013.01)

(58) Field of Classification Search
None
See application file for complete search history.

(56) References Cited

U.S. PATENT DOCUMENTS

| 8,965,170 B1 * | 2/2015 | Benea ................ H04N 21/4223 386/224 |
| 2010/0295839 A1 * | 11/2010 | Nagaya ................ G06F 1/3265 345/212 |

(Continued)

*Primary Examiner* — Amr Awad
*Assistant Examiner* — Donna Lui
(74) *Attorney, Agent, or Firm* — Sughrue Mion, PLLC

(57) ABSTRACT

There is provided a display device which includes a display panel, a backlight that has a plurality of light sources and applies light to the display panel, a human body detector configured to detect a human body located around the display panel, a human body information acquisition unit configured to acquire information on the human body, and a control that controls an operation of a user recognition unit when the human body is detected in a standby mode, performs user recognition based on the acquired human body information, controls an operation of the display panel such that notification information of the user is displayed in a portion of the display panel, and turns some light sources out of the plurality of light sources on. According to the invention, for the user who views the display device, the local dimming is performed on the backlight which provides content information desired by the user utilizing only a portion of the display device. Therefore, it is possible to increase dynamic contrast and reduce power consumption more than in global dimming. Accordingly, the user may enter a personalized mode of a TV, and content information is provided to the user in the standby mode.

18 Claims, 12 Drawing Sheets

(51) Int. Cl.
    *G10L 15/00*           (2013.01)
    *G10L 17/00*           (2013.01)

(56)           References Cited

U.S. PATENT DOCUMENTS

| | | | |
|---|---|---|---|
| 2011/0057796 A1* | 3/2011 | Candelore | G08B 25/14 340/565 |
| 2012/0113151 A1* | 5/2012 | Nakano | G06F 3/0484 345/682 |
| 2012/0320273 A1* | 12/2012 | Toyoda | H04N 5/63 348/569 |
| 2014/0097956 A1* | 4/2014 | Imamura | G06F 21/32 340/573.1 |
| 2015/0242986 A1* | 8/2015 | Yoshizawa | G09G 5/00 345/522 |

\* cited by examiner

DISPLAY DEVICE AND METHOD FOR REDUCING POWER CONSUMPTION THROUGH BACKLIGHT CONTROL OF ON AND OFF LIGHT SOURCE REGIONS

CROSS-REFERENCE TO RELATED APPLICATION

This application claims the benefit of Korean Patent Application No. 10-2013-0115971, filed on Sep. 30, 2013 in the Korean Intellectual Property Office, the disclosure of which is incorporated herein by reference.

BACKGROUND

1. Field

Exemplary embodiments of the present invention relate to a display device for saving power and a method of controlling the same.

2. Description of the Related Art

A display device is a device that displays visual and stereoscopic image information.

Recently, there have been flat display devices developed having excellent performance in various aspects, such as fewer constraints of an installation space due to reduction of the weight and volume that have been disadvantageous in cathode ray tube displays, easy implementation of a large screen image, easy flattening, and a high quality picture.

Examples of flat display devices include a liquid crystal display device (LCD), an electro-luminescence display device (ELD), a field emission display device (FED), a plasma display device (hereinafter referred to as a "PDP"), and a thin film liquid crystal display (TFT-LCD), a flexible display, and the like.

Among these, due to light weight, low power consumption, a thin shape, and the like, LCDs have been increasingly applied to flat TVs, monitors, portable displays, and the like.

LCDs are displays in which a liquid crystal having an intermediate property between solid and liquid is injected between two thin glass plates, an arrangement of liquid crystal molecules is changed when power is supplied, contrast is generated, and thereby an image is displayed. Unlike PDPs, FEDs, organic ELDs, or the like, LCDs are non-luminous elements (light-receiving elements), therefore LCDs cannot be used without a separate light-emitting unit. Therefore, a surface light source type backlight that can maintain uniform luminosity on an entire screen is necessary. That is, LCDs display images using light radiated from backlights.

Personal televisions using LCDs provide personalized information through a personalized login when power is turned on.

Due to one-way broadcast delivery, such personal televisions require that users be in front of the television, search for and select desired content, and view broadcasts delivered from the television.

This means that, when the personal television is turned off, there are many instances in which users miss desired content that is broadcast. Therefore, there is a problem in that personalization is possible only when the personal television is always turned on.

When the personal television is always turned on, it is possible to display a personal screen. However, it requires that all light sources of the backlight to be turned on, which results in inefficient power consumption.

SUMMARY

According to an exemplary embodiment, there are provided a display device that recognizes a user when a human body is detected in a standby mode and outputs content information related to the recognized user in a portion of a display panel using local dimming, and a method of controlling the same.

According to an exemplary embodiment, there is provided a display device that outputs content information in a portion of a display panel using local dimming when a human body is detected in a standby mode, and a method of controlling the same.

The display device according to an aspect of an exemplary embodiment includes a display panel, a backlight that comprises a plurality of light sources and applies light to the display panel, a human body detector configured to detect a human body located near the display panel, a human body information acquisition unit configured to acquire information on the human body, and a control configured to control an operation of the human body information acquisition unit when the human body is detected in a standby mode, performs user recognition based on the acquired human body information, controls an operation of the display panel such that notification information of the user is displayed in a portion of the display panel, and turns on some light sources out of the plurality of light sources.

The human body detector may include any from among an infrared sensor, a camera, and a microphone.

The human body information acquisition unit may include an imager configured to acquire an image of the human body, and the control may recognize the user based on the acquired image.

The human body information acquisition unit may include a speech unit configured to collect speech of the human body, and the control may perform user recognition based on speech recognition of the collected speech.

The display device may further include a storage configured to store at least one piece of user recognition information and notification information corresponding to the at least one piece of user recognition information, wherein the control may recognize the user by comparing the acquired human body information with the user recognition information, identify whether notification information of the recognized user is stored when the human body is determined as a human body of a previously registered user, and control displaying of stored notification information when the notification information of the recognized user is stored.

When it is determined that the notification information of the recognized user is not stored in the storage, the control may identify recommended content and control displaying of the identified content.

The backlight may include a first light emitting region in which some light sources of the plurality of light sources in the backlight are located and which is a region corresponding to a portion of the display panel and a second light emitting region in which the remaining light sources of the plurality of light sources are located.

When the notification information of the user is displayed, the control may control power supplied to a light source of the first light emitting region and inhibit power supplied to a light source of the second light emitting region.

The notification information of the user may include information of the content viewed at a predetermined viewing ratio or more by the user.

The display device may further include an input configured to receive a user command, wherein the control may turn on the plurality of light sources of the backlight when a reproducing command of the content information is input while the content information is displayed, and turn off the light source, which was previously turned on, such that displaying of the content information is terminated when a predetermined time has elapsed from a time at which the content information is displayed.

When a record command of the content is input while the content information is displayed, the control may control recording of the content and turn the light source, which was turned on, off such that displaying of the content information is terminated.

The display device may further include a communicator configured to receive a user command input to an external remote controller.

The control may recognize a motion in the acquired human body information and recognize a user command based on the recognized motion.

The control may recognize speech in the acquired human body information and recognize a user command based on the recognized speech.

When the number of recognized users is plural, the control may identify notification information of the plurality of users and control displaying of the identified notification information.

When the number of recognized users is plural, the control may determine a user having the highest priority among the plurality of users, identify notification information of the determined user, and control displaying of the identified notification information.

The display device according to another exemplary embodiment includes a display panel, a backlight comprising a plurality of light sources and applies light to the display panel, a human body detector configured to detect a human body, and a control configured to control an operation of the display panel such that notification information of a user is displayed in a portion of the display panel and turns on some light sources of the plurality of light sources when it is determined that the human body is detected in a standby mode.

The notification information of the user may include content information viewed at a predetermined viewing ratio, the backlight may include a first light emitting region in which some light sources from among the plurality of light sources are located, and which is a region corresponding to a portion of the display panel and a second light emitting region in which the remaining light sources from among the plurality of light sources are located, and the control may turn on a light source of the first light emitting region, turn off a light source of the second light emitting region when a current mode is in a first display mode for displaying the user notification information, and turn on the light sources of the first light emitting region and the second light emitting region when the current mode is in a second display mode for reproducing content.

When a predetermined time has elapsed from a time at which the content information is displayed, the control may turn off the light source of the first light emitting region such that displaying of the content information is terminated.

The display device may further include an input configured to receive a user command, wherein, when a record command of the content is input while the content information is displayed, the control may control recording of the content and turn off the light source of the first light emitting region such that displaying of the content information is terminated.

According to another exemplary embodiment, there is provided a method of controlling a display device which includes a display panel and a backlight for providing light to the display panel. The method includes performing an operation of detecting a human body using a human body detector in a standby mode, controlling an operation of a human body information acquisition unit when the human body is detected, performing user recognition based on the acquired human body information, and displaying content information of the recognized user in a portion of the display panel by controlling an operation of the display panel and turning on some light sources from among a plurality of light sources.

The performing of the user recognition may include acquiring an image of the human body and recognizing the user based on the acquired image.

The performing of the user recognition may include collecting human speech and performing user recognition based on speech recognition of the collected speech.

The displaying of the content information may include recognizing the user by comparing the acquired human body information with pre-stored user recognition information, identifying whether content information of the recognized user is stored when the human body is determined as a human body of a previously registered user, and controlling displaying of stored content information when the content information of the recognized user is stored.

The method may further include receiving a recommendation of content from a content providing server and displaying information of the recommended content when it is determined that notification information of the recognized user is not stored in the storage.

The displaying of the content information may include controlling driving of a portion of the display panel corresponding to a first light emitting region in which some light sources from among a plurality of light sources arranged in the backlight are located.

The displaying of the content information of the user may include controlling a power supply for a light source of the first light emitting region and inhibiting power supplied to a light source of a second light emitting region that is a region other than the first light emitting region.

The method may further include turning on the plurality of light sources of the backlight and performing content reproduction by operating the display panel when a reproducing command of the content information is input while the content information is displayed.

The method may further include turning off the light source of the backlight, which was previously turned on, such that displaying of the content information is terminated when a predetermined time has elapsed from a time at which the content information is displayed.

The method may further include controlling recording of the content and turning off the light source, which was previously turned on, such that displaying of the content information is terminated when a record command of the content is input while the content information is displayed.

According an exemplary embodiment, local dimming is performed on the backlight of the display device. Therefore, it is possible to increase dynamic contrast and reduce power consumption more efficiently than in global dimming.

In addition, it is possible to provide the user who views the display device with content desired by the user utilizing only a portion of the display device.

Accordingly, the user may easily enter into a personalized mode of a TV.

Moreover, content information is provided to the user in the standby mode so that viewers are attracted to the television, which results in an increase in time spent viewing the television.

BRIEF DESCRIPTION OF THE DRAWINGS

These and/or other exemplary embodiments will become apparent and more readily appreciated from the following description of the embodiments, taken in conjunction with the accompanying drawings of which.

DETAILED DESCRIPTION

Hereinafter, exemplary embodiments will be described in detail with reference to the accompanying drawings.

Figure 1:
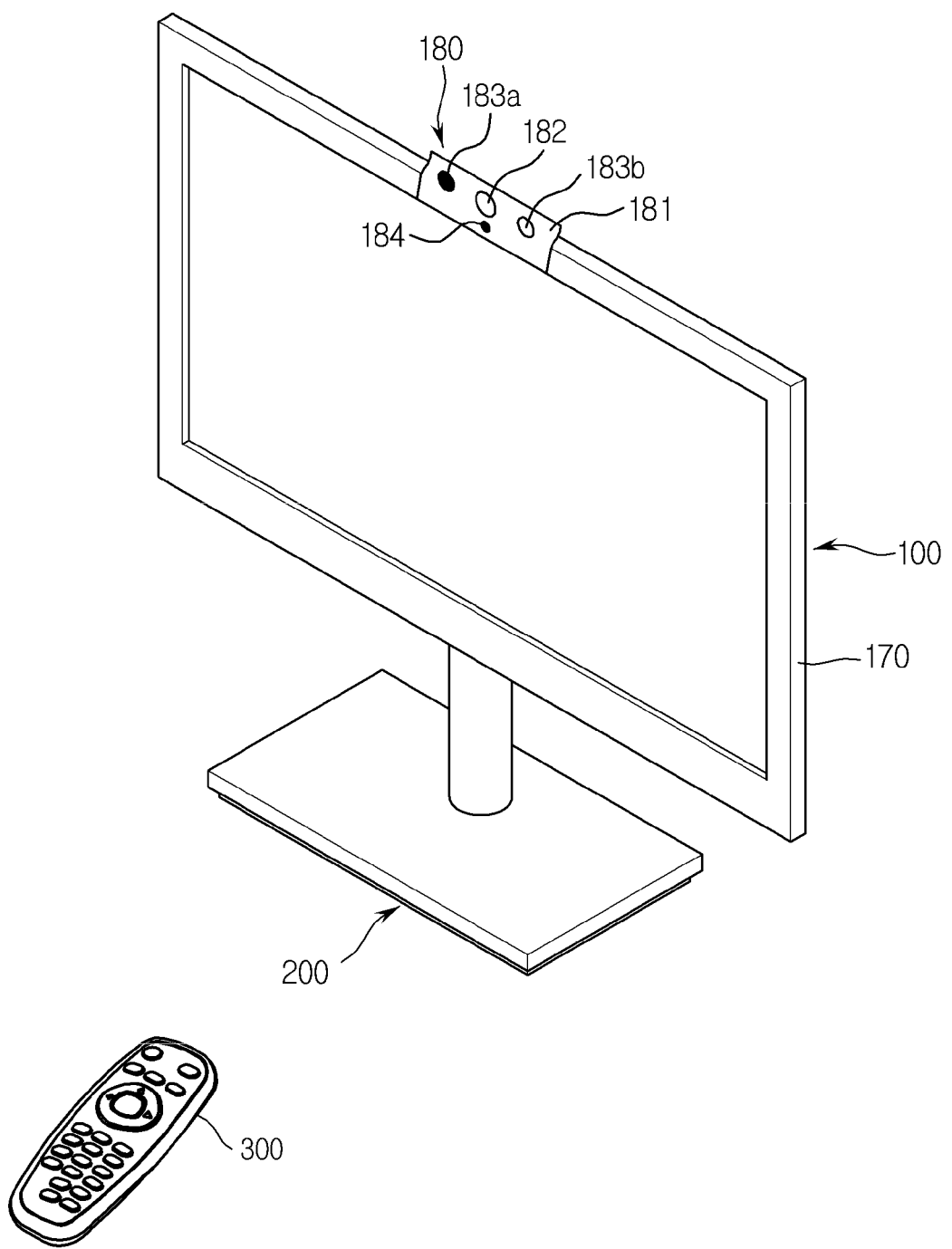
FIG. 1 is a diagram illustrating an exemplary display device according to an exemplary embodiment.
Figure 2:
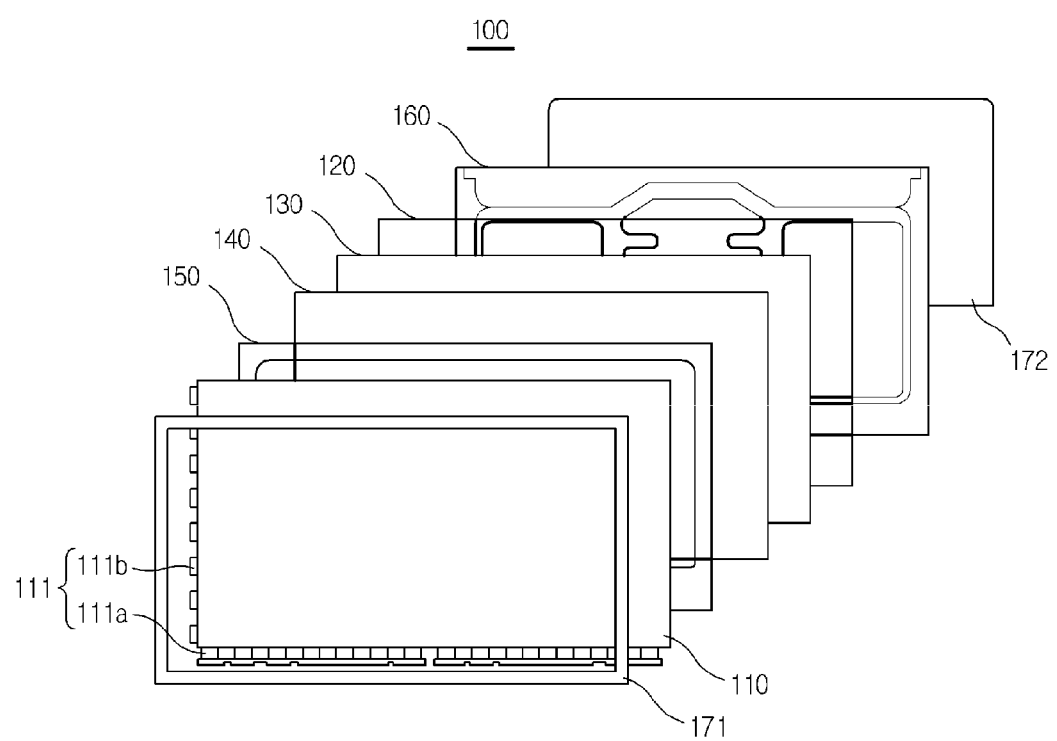
FIG. 2 is an exploded perspective view of a display device according to an exemplary embodiment.
Figure 3:
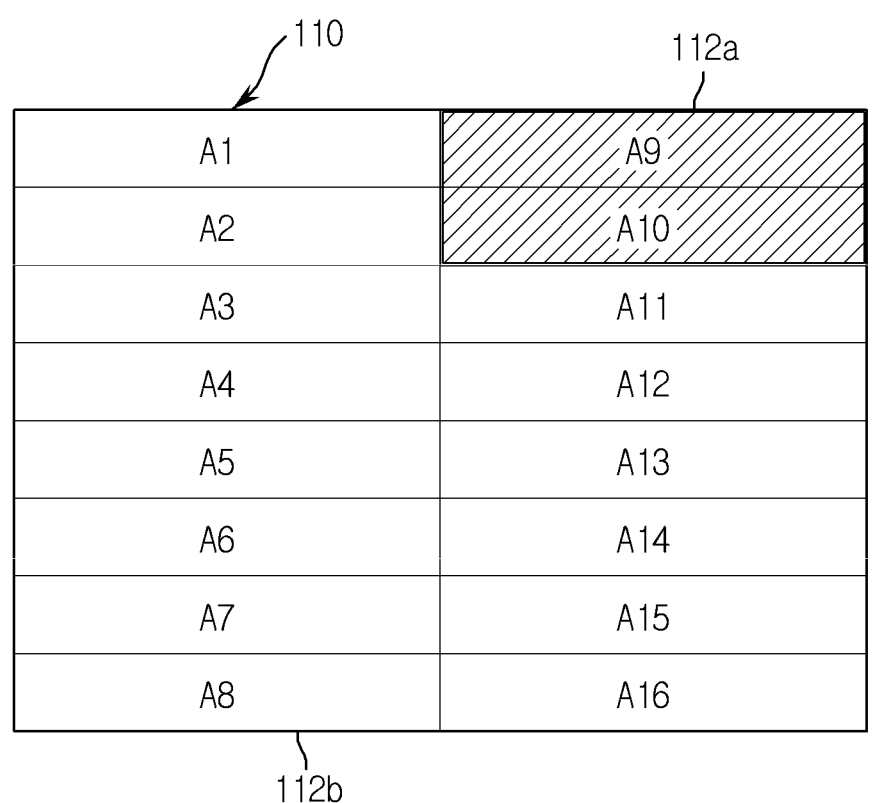
FIG. 3 is a diagram illustrating an exemplary display panel according to an exemplary embodiment.
Figure 4:
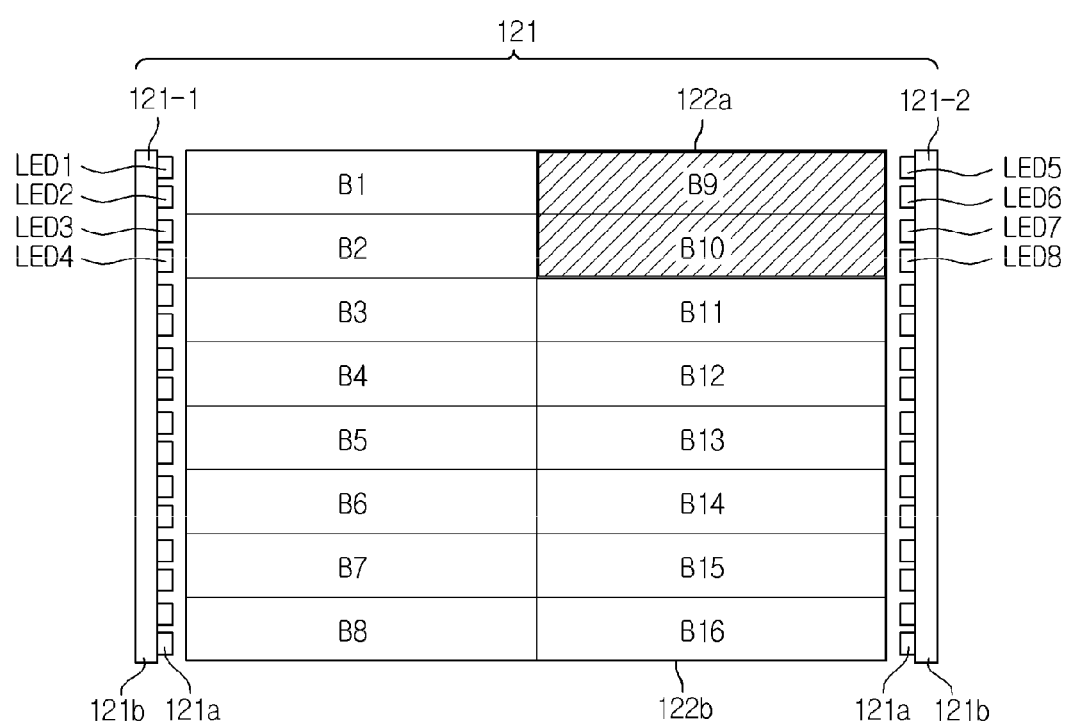
FIG. 4 is a diagram illustrating an exemplary backlight in a display device according to an exemplary embodiment.
Figure 5:
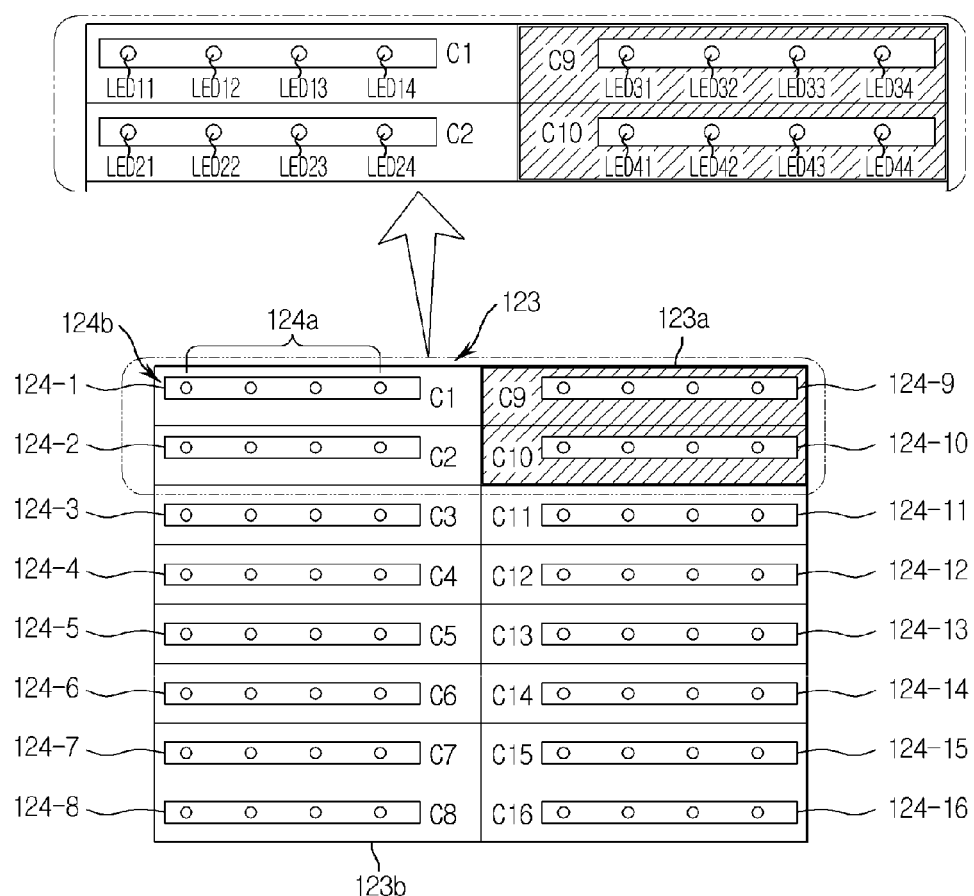
FIG. 5 is a diagram illustrating another exemplary backlight in a display device according to an embodiment.

FIG. 1 is a diagram illustrating an exemplary display device according to an embodiment. FIG. 2 is an exploded perspective view of a display device according to an embodiment. FIG. 3 is a diagram illustrating an exemplary display panel according to an embodiment. FIGS. 4 and 5 are diagrams illustrating an exemplary backlight in a display device according to an embodiment.

A display device 100 is a device for displaying an image such as a television, a monitor, and a display of a mobile communication terminal.

The display device 100 displays an image and outputs a sound. Here, the sound may also be output through a device provided externally of the display device.

As illustrated in FIG. 1, the display device 100 may be supported by a stand 200 installed in a lower part thereof or may be installed in a wall using a bracket or the like.

The display device 100 receives a command of a user through a remote controller 300 provided externally and performs an operation based on the received command.

This display device 100 includes a display panel 110 for displaying an image, a housing 170 for protecting the display panel, and an information acquisition module 180 that is installed in the housing 170 and is used for user recognition.

In this exemplary embodiment, among display devices, a liquid crystal display device (LCD) will be described as an example. The LCD is unable to emit light, and thus displays an image through a display panel by adjusting a penetration amount of light emitted from a backlight.

Also, in this embodiment, a television will be described as an example among a television, a monitor, and a display of a mobile communication terminal.

As illustrated in FIG. 2, the television serving as the display device 100 includes the display panel 110, a backlight 120, a diffuse sheet 130, an optical sheet 140, a support member 150, a chassis 160, and a housing 170 (171 and 172). In addition, the display device 100 may further include the information acquisition module 180 for user recognition.

The display panel 110 is a panel that displays image information such as text, numbers, and any icons by adjusting transmittance of light passing through a liquid crystal layer. Here, transmittance of light passing through the liquid crystal layer may be adjusted according to a strength of voltage to be applied.

The display panel 110 includes a color filter array panel, a thin film transistor array panel (TFT panel), a liquid crystal layer, and a sealant. Here, the color filter array panel and the TFT panel are made of a glass material.

The color filter array panel includes color filters of red, green, and blue formed in a region corresponding to a pixel electrode of the TFT panel so that color is displayed for each pixel. In addition, a common electrode made of a transparent conductive material such as indium tin oxide (ITO) or indium zinc oxide (IZO) is formed in the color filter array panel.

The TFT panel of the display panel 110 is disposed separately from the color filter array panel and includes a plurality of gate lines, data lines, and pixel electrodes.

Here, the gate lines are arranged in a row direction and deliver a gate signal, the data lines are arranged in a column direction and deliver a data signal, and the pixel electrodes are connected to the gate lines and the data lines and include a switching device and a maintenance capacitor.

Here, the switching device is formed at a cross point of the gate line and the data line, and the maintenance capacitor is connected to an output terminal of the switching device.

The other terminal of the maintenance capacitor is connected to common voltage or connected to the gate line.

The display panel 110 further includes a liquid crystal layer disposed between the color filter array panel and the TFT panel. This liquid crystal layer includes a sealing material and a liquid crystal accommodated in the sealing material.

In the liquid crystal layer, an arrangement direction is changed by an external voltage. At this time, transmittance of light passing through the liquid crystal layer is adjusted.

Meanwhile, the color filter array panel, the TFT panel, and the liquid crystal layer of the display panel 110 comprise a liquid crystal capacitor. The liquid crystal capacitor configured in this way is connected to the output terminal of the switching device of the pixel electrode, the common voltage, or reference voltage.

The sealant is formed in a frame of the color filter array panel and the TFT panel of the display panel 110 and combines the color filter array panel and the TFT panel. This sealant enables a shape of the display panel 110 to be maintained.

The display panel 110 further includes an image driver 111.

The image driver 111 includes a first driver 111a for driving an X electrode and a second driver 111b for driving a Y electrode. Here, the X electrode refers to a source electrode, and the Y electrode refers to a gate electrode. Both the first driver 111a and the second driver 111b are connected to a driving module 190.

The first driver 111a selects grayscale voltage for each data line based on image data and delivers the selected grayscale voltage to the liquid crystal through the data line.

The second driver 111b delivers an on-off signal based on the image data to a thin film transistor serving as the switching device through a scanline such that the TFT is turned on or off.

That is, when the first driver 111a supplies voltage corresponding to each color value, the second driver 111b receives the voltage and applies the voltage to a corresponding pixel.

The source electrode of the TFT is connected to the data line, the gate electrode is connected to the scanline, and a drain electrode of the TFT is connected to the pixel electrode of the ITO. This TFT is turned on when a scan signal is supplied to the scanline and supplies the data signal supplied from the data line to the pixel electrode.

Predetermined voltage is applied to the common electrode, and thereby an electric field is formed between the common electrode and the pixel electrode. Due to the electric field, an arrangement angle of the liquid crystal between liquid crystal panels is changed. A light transmittance is changed according to the changed arrangement angle, and thereby a desired image is displayed.

The driving module 190 supplies a gate control signal, a data control signal, and a data driving signal and a gate driving signal based on a data signal associated therewith to the data line and the gate line formed on the TFT panel so that a desired image is implemented on the display panel 110. This will be described below.

As illustrated in FIG. 3, the display panel 110 includes a plurality of display cells (A1 to A16) which have a predetermined size.

Some display cells from among the plurality of display cells of the display panel 110 form a first display region 112a which turns on a light source in a first display mode for displaying user information. Display cells other than the first display region form a second display region 112b which turns off a light source in the first display mode for local dimming and turns on a light source in a second display mode for reproducing content or broadcasts.

Here, the first display region 112a includes at least one display cell.

The backlight 120 is configured to emit light toward the display panel 110, and emits light using a light source (LED) disposed in an edge type or a direct type.

This backlight 120 may be a direct type backlight in which a plurality of light sources are arranged in a lower surface of the display panel and radiate light, or an edge type backlight in which a light guide plate is installed in a lower surface of the display panel and a plurality of light sources are arranged in at least one side of the light guide plate and radiate light.

These edge type backlights and direct type backlights will be described with reference to FIGS. 4 and 5.

As illustrated in FIG. 4, an edge type backlight 120 includes a plurality of optical modules 121 (121-1 and 121-2), a reflection sheet (not illustrated) and a light guide plate 122 disposed between the plurality of optical modules.

Each optical module 121 (121-1 and 121-2) includes a light source 121a for outputting light and a light driver 121b for driving the light source 121a such that light is output from the light source 121a.

Here, the light source 121a includes LEDs serving as a plurality of light sources that generate light with high efficiency and low power, and the light driver 121b supplies or blocks power applied to the LED or adjusts an amount of power supplied to the LED, and is a printed circuit board (PCB) on which the plurality of LEDs are electrically mounted.

The light guide plate 122 guides incident light to the display panel 110, and is made in a flat shape using a plastic material such as polymethyl methacrylate (PMMA) that is an acryl-based transparent resin or a polycarbonate (PC) as a permeable material capable of transmitting light.

This light guide plate 122 has excellent transparency, weatherability, and a coloring property and thus induces diffusion of light when light is transmitted.

The reflection sheet (not illustrated) is disposed in a side of the light guide plate 122 and reflects light provided from a side surface of the light guide plate 122 to a side surface of the light guide plate 122 or to the display panel 110 side.

The light guide plate 122 of the backlight includes a plurality of guide cells (B1 to B16) which have a predetermined size.

Light emitted from each light source is incident on the light guide plate. At this time, the light incident on the light guide plate spreads out while diffusing, scattering, and reflecting inside the light guide plate. That is, light output from one light source spreads to the plurality of guide cells of the light guide plate.

As a result, each guide cell of the light guide plate receives light from the plurality of light sources which are arranged therearound. In this case, each guide cell of the light guide plate receives the greatest amount of light from at least one light source that is disposed most adjacent thereto and guides the light to the display panel 110.

For example, the light guide plate 122 of the backlight includes a first guide cell (B1) to a sixteenth guide cell (B16).

The first guide cell (B1) receives light of a first light source (LED1), a second light source (LED2), a third light source (LED3), and a fourth light source (LED4). Among these, the greatest amount of light is received from the first light source (LED1) and the second light source (LED2) which are disposed closest to the first guide cell.

That is, the first guide cell (B1) receives the greatest amount of light from the first light source (LED1) and the second light source (LED2), and guides the light of the first light source (LED1) and the second light source (LED2) to the display panel 110.

In addition, the second guide cell (B2) receives light from a third light source (LED3) and a fourth light source (LED4) which are disposed adjacent to the second guide cell, the ninth guide cell (B9) receives light from a fifth light source (LED5) and a sixth light source (LED6) which are disposed adjacent to the ninth guide cell, and the tenth guide cell (B10) receives light from a seventh light source (LED7) and an eighth light source (LED8) which are disposed adjacent to the tenth guide cell.

The third guide cell (B3) to the eighth guide cell (B8), and the eleventh guide cell (B11) to the sixteenth guide cell (B16) also receive light from the light sources disposed closest thereto.

Moreover, each of the plurality of guide cells (B1 to B16) of the light guide plate faces the plurality of display cells (A1 to A16) of the display panel. Accordingly, the plurality of guide cells (B1 to B16) of the light guide plate guide emitted light to display cells (A1 to A16) of the display panel, respectively.

Some guide cells from among the plurality of guide cells of the light guide plate form a first light emitting region 122a which turns on the light source in the first display mode for displaying user information. Remaining guide cells form a second light emitting region 122b which turns off the light source for local dimming in the first display mode and turns on the light source in the second display mode for reproducing content or broadcasts.

Here, the remaining guide cells refer to at least one cell other than the guide cells forming the first light emitting region.

Also, the first light emitting region 122a includes at least one guide cell.

As illustrated in FIG. 5, a direct type backlight 120 includes a base 123 and a plurality of optical modules 124 (124-1 to 124-16) which are fixedly installed in the base.

The plurality of optical modules include a light source 124a for outputting light and a light driver 124b that drives the light source 124a such that light is output from the light source 124a.

Here, the light source 124a includes a plurality of LEDs serving as the light sources for generating light with high efficiency and low power, and the light driver 124b supplies or inhibits power applied to the LED or adjusts an amount of power supplied to the LED and is a PCB on which the plurality of LEDs are electrically mounted.

Each light source module comprises an LED array in which the plurality of LEDs are arranged in one light driver and the LEDs in this LED array are electrically connected to one light driver.

The plurality of optical modules may be arranged in the base 123 at predetermined intervals.

Also, the base 123 of the direct type backlight includes a plurality of guide cells which have a predetermined size and the optical module is disposed in each guide cell.

For example, the base 123 of the backlight includes a first guide cell (C1) to a sixteenth guide cell (C16).

The first guide cell (C1) provides light of a first light source (LED11), a second light source (LED12), a third light source (LED13), and a fourth light source (LED14) to the display panel. The second guide cell (C2) provides light of a fifth light source (LED21), a sixth light source (LED22), a seventh light source (LED23), and an eighth light source (LED24) to the display panel.

In addition, the ninth guide cell (C9) provides light of a ninth light source (LED31), a tenth light source (LED32), an eleventh light source (LED33), and a twelfth light source (LED34) to the display panel, and the tenth guide cell (C10) provides light of a thirteenth light source (LED41), a fourteenth light source (LED42), a fifteenth light source (LED43), and a sixteenth light source (LED44) to the display panel.

Moreover, the third guide cell (C3) to the eighth guide cell (C8), and the eleventh guide cell (C11) to the sixteenth guide cell (C16) also provide light of the light source disposed in each guide cell to the display panel.

Each of the plurality of guide cells (C1 to C16) of the base 123 of the backlight faces the plurality of display cells (A1 to A16) of the display panel. Accordingly, the plurality of guide cells (C1 to C16) of the base guide light to facing display cells (A1 to A16) of the display panel, respectively.

Some guide cells from among the plurality of guide cells of the base 123 of the backlight form a first light emitting region 123a which turns on the light source in the first display mode for displaying user information. Remaining guide cells form a second light emitting region 123b which turns off the light source for local dimming in the first display mode and turns on the light source in the second display mode for reproducing content or broadcasts.

Here, the remaining guide cells refer to at least one cell other than the guide cells forming the first light emitting region.

Also, the first light emitting region 123a includes at least one guide cell.

The diffuse sheet 130 is provided between the display panel 110 and the backlight 120 and is a translucent panel which diffuses light output from the backlight 120 along a surface and enables colors and luminosity to be uniformly displayed throughout a screen. The diffuse sheet increases the brightness of the light emitted from the backlight 120 and supplies the light to the display panel 110.

That is, the diffuse sheet 130 increases the brightness of the light of the LED of the backlight 120 and uniformly maintains luminosity of an entire surface.

The optical sheet 140 is a sheet disposed between the display panel 110 and the diffuse sheet 130, and improves light characteristics using a method such as uniformly maintaining brightness of light of the backlight, and collecting diffused light or light with high brightness, and provides the improved light to the display panel 110.

The support member 150 supports the display panel 110, the diffuse sheet 130, the optical sheet 140, and the backlight 120 which are disposed between a bezel 171 and a cover 172.

Also, the support member 150 maintains a distance between the display panel 110 and the optical sheet 140, a distance between the diffuse sheet 130 and the optical sheet 140, and a distance between the diffuse sheet 130 and the backlight 120.

The chassis 160 is a panel that connects various components necessary for image display and sound output. Various PCBs, 10 devices, and the like are mounted on the chassis 160.

That is, the driving module 190 for driving the image driver and the light driver is disposed in the chassis 160.

This chassis 160 is made of a metal having excellent heat dissipation and strength.

A driving module (not illustrated) for driving the display panel 110 and the backlight 120 is disposed in the chassis 160.

The housing 170 includes the bezel 171 and the cover 172.

Here, the bezel 171 fixes the display panel 110 supported by the support member 150 and detachably connected to the support member 150 or the cover 172.

When the bezel 171 is connected to the cover 172, an accommodating space is formed. The display panel 110, the backlight 120, the diffuse sheet 130, the optical sheet 140, the chassis 160, and the like are disposed in this accommodating space.

The information acquisition module 180 includes a case 181, an imager 182 installed in the case 181, first and second speech units 183a and 183b which are installed in the case 181 and installed in both sides of the imager 182, respectively, and a controller (not illustrated) for delivering an image and speech acquired through the imager 182 and the first and second speech units 183a and 183b to the driving module 190.

The display device is located in the bezel 171 and may further include a human body detector 184 for detecting a human body located therearound.

In addition, the human body detector 184 may also be located in the information acquisition module 180.

Figure 6:
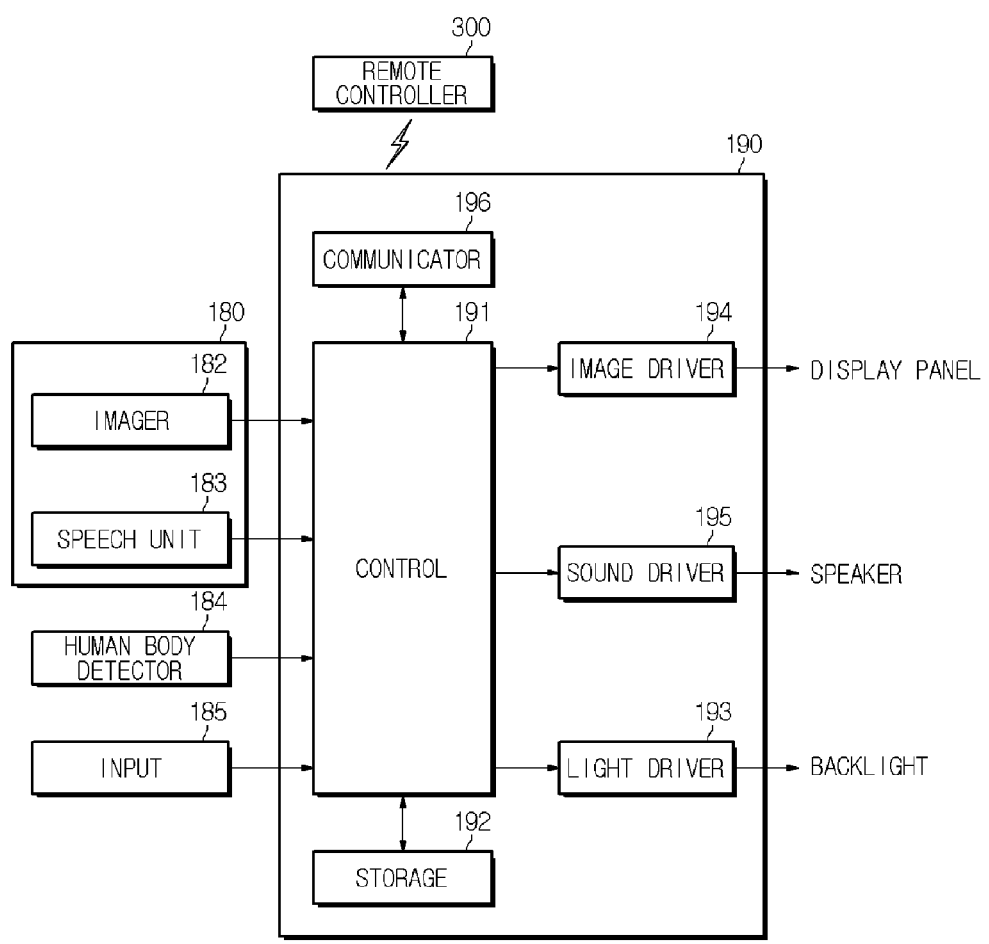
FIG. 6 is a diagram illustrating a control configuration of a display device according to an exemplary embodiment.

FIG. 6 is a diagram illustrating a control configuration of a display device according to an exemplary embodiment.

The information acquisition module 180 is a module for acquiring information on the human body in order to recognize the user, and includes at least one of the imager 182 for acquiring an image of the human body and the speech unit 183 for acquiring speech of the human body. Here, the speech unit may be implemented in multiple units.

The imager 182 and the speech unit 183 of this information acquisition module 180 maintain a stop state in a standby mode, and perform an operation by receiving power for the operation when it is determined that the human body has been detected.

Here, the imager 182 includes a camera and the speech unit 183 includes a microphone.

Also, the image acquired by the imager 182 may be used to recognize a face of the user or a motion of the user.

In addition, the speech acquired by the speech unit may be used to recognize speech of the user or a speech command of the user.

The human body detector 184 detects the human body located around the display device 100.

This human body detector 184 receives power for the operation and performs the operation when the display device is in a standby mode, and stops the operation for detecting the human body when the display device performs a reproduction operation.

This human body detector 184 includes any of an infrared sensor, a camera, and a microphone.

Hereinafter, exemplary implementation of the information acquisition module and the human body detector will be described.

(1) When the information acquisition module is the camera and the human body detector is the infrared sensor:

The display device stops an operation of the camera in a standby mode. When the human body is detected through the infrared sensor while the infrared sensor operates, the display device operates the camera and acquires an image of the user for user recognition. In this case, it is also possible to stop the operation of the infrared sensor.

(2) When the information acquisition module is the microphone and the human body detector is the infrared sensor:

The display device stops an operation of the microphone in a standby mode. When the human body is detected through the infrared sensor while the infrared sensor operates, the display device operates the microphone and acquires speech of the user for user recognition. In this case, it is also possible to stop the operation of the infrared sensor.

(3) When a single camera is used as the information acquisition module and the human body detector:

The display device operates the camera in a standby mode and analyzes the image acquired by the camera. When it is determined that there is the human body, the display device recognizes the user using the acquired image of the human body.

(4) When at least one microphone is used as the information acquisition module and the human body detector:

The display device operates the microphone in a standby mode and analyzes the speech acquired through the microphone. When it is determined that there is a human body, the display device recognizes the user using the acquired speech of the human body. In addition, when there are a plurality of microphones, speech processing is performed on the speech acquired through the plurality of microphones using a method such as beamforming. Therefore, it is possible to acquire information on a location at which the speech is produced. That is, it is possible to determine whether the user is located in front of the display device. Accordingly, it is possible to identify a viewing intention of the user.

An input 185 is provided in the housing of the display device, receives a command from the user through a power button, a channel selection button, a volume selection button, and the like, which are electrically connected to the driving module 190, and transmits an input signal to the driving module 190.

When a content reproducing command is input, the driving module 190 drives the image driver and the light driver such that an image of the content is displayed in the display panel and a sound of the content is output through a speaker.

When the human body is detected in a standby mode, the driving module 190 drives the image driver and the light driver such that content information is displayed in the first display region which is a portion of the display panel.

This driving module 190 includes a control 191, a storage 192, a light driver 193, an image driver 194, a sound driver 195, and a communicator 196.

When a power on command is input (not illustrated) provided in the display device or the communicator 196, the control 191 controls driving of the display panel 110 and the backlight 120 such that the content is displayed.

When the display device is connected to commercial power and is in a standby mode in which a power button (not illustrated) is turned off, the control 191 controls the operation of the human body detector 184, determines whether there is a human near the display device based on a signal detected by the human body detector, and controls the operation of the information acquisition module and acquires human body information of the human when it is determined that there is the human.

The control 191 performs user recognition that determines whether the detected human is a registered user based on the acquired human body information, and when it is determined that the detected human is the registered user, performs control such that operations of the first light emitting region of the backlight and the first display region of the display panel are turned on and operations of the second light emitting region of the backlight and the second display region of the display panel are turned off, and thereby content information of the recognized user is displayed in a portion of the display device.

When a reproducing command is input while content information is displayed in a portion of the display device, the control 191 controls operations of the first and second light emitting regions of the backlight and the first and second display regions of the display panel so that corresponding content is displayed in an entire region of the display device.

When a record command is input while content information is displayed in a portion of the display device, the control 191 performs a recording operation, and performs control such that the first light emitting region of the backlight and the first display region of the display panel are turned off, and thereby the content information displayed in the portion of the display device disappears.

When a predetermined time has elapsed from a time at which the content information is displayed in the portion of the display device, the control 191 performs control such that the first light emitting region of the backlight and the first display region of the display panel are turned off, and thereby the content information displayed in the portion of the display device disappears.

When there are a plurality of recognized users, the control 191 identifies content information of the plurality of users, and may extend the size of the first light emitting region of the backlight and the first display region of the display panel so that the identified content information is displayed in a larger region.

In addition, the control 191 may adjust the sizes of the first light emitting region of the backlight and the first display region of the display panel according to the content information to be displayed.

When there are a plurality of recognized users, the control 191 determines a user having the highest priority, identifies content information of the user having the highest priority, and displays the identified content information.

According to a command of the user, the control 191 may also reset a location of a pop-up window for displaying content information.

The storage 192 stores information on the registered user and content information for each user.

Here, user information includes an ID of the user, facial image information of the user, and speech information of the user.

The content information for each user is information on content that is viewed at a preset viewing ratio or more by each user, and includes a content name, a channel, a content broadcasting time, and the like.

The storage 192 stores priorities of the plurality of users.

The storage 192 may also store a command for each motion and a command for each speech.

The storage 192 stores location information of the first display region and the location information of the light source disposed in the first light emitting region serving as locations for outputting the content information.

In addition, the locations of the first display region and the first light emitting region for outputting the content information may be changed based on a command of the user.

Based on a command of the control 191, the light driver 193 turns on only the light source located in the first light emitting region, or turns on the light sources located in the first light emitting region and the second light emitting.

Based on a command of the control 191, the image driver 194 turns on only an electrode located in the first display region of the display panel, or turns on electrodes located in the first display region and the second display region of the display panel.

Based on a command of the control 191, the sound driver 195 operates the speaker such that a sound of the content is output while the content is reproduced.

In addition, based on a command of the control 191, the sound driver 195 may also operate the speaker such that content information is output as a sound when content information is output.

The communicator 196 communicates with an external remote controller and receives a user command input to the remote controller.

The communicator 196 may also receive a broadcasting signal from a broadcasting station or a satellite via wired and/or wireless communication.

The driving module may also further include a tuner that receives and tunes a broadcasting signal having a corresponding frequency band according to a tuning control signal of the control 191 from a broadcasting station or a satellite via wired and/or wireless communication, and a first signal processor (not illustrated) that separates the broadcasting signal into an image signal having image data, a sound signal having sound data, and an additional signal having additional data, performs signal processing on the separated signals of the image data and the sound data, and transmits the additional data to a GUI generating unit (not illustrated).

Also, the communicator 196 may be assigned an IP address and perform network communication.

In this case, the communicator 196 receives and processes a data packet transmitted from the outside via a network, and transmits the data packet to the control 191 for storing or reproducing when the data packet is multimedia data such as an image or a sound.

In addition, the display device may also further include a second signal processing unit (not illustrated) that separates the signal transmitted from the communicator into an image signal having image data and a sound signal having sound data, and performs signal processing on the separated image signal and sound signal.

Figure 7:
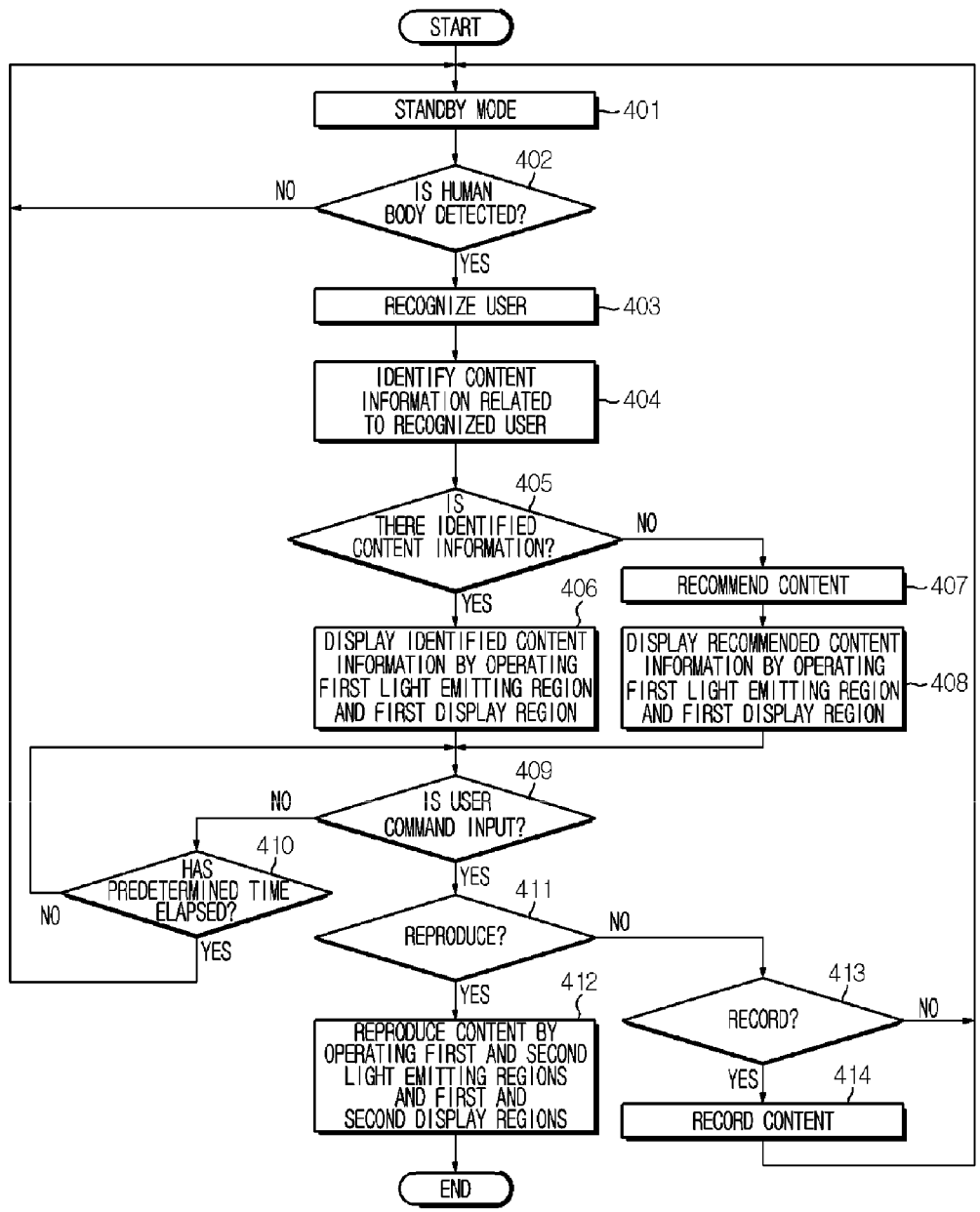
FIG. 7 is a flowchart illustrating control of a display device according to an exemplary embodiment.

FIG. 7 is a flowchart illustrating control of a display device according to an embodiment and will be described with reference to FIGS. 8 and 9.

When the user does not view a television serving as the display device, the television serving as the display device maintains a standby mode (401).

Here, the standby mode refers to a state in which the display device is connected to external commercial power and is supplied with power from the commercial power, but is supplied with only minimum power for receiving a signal of the remote controller and a signal of external broadcasting and external content. At this time, the display panel and the backlight are turned off and are not supplied with power.

The display device supplies power for an operation to the human body detector 184 in the standby mode and controls the operation of the human body detector 184.

The display device determines whether the human body is detected based on the signal detected through the human body detector 184 (402). When it is determined that the human body has been detected, the display device supplies power for an operation to the information acquisition module 180 and controls the operation of the information acquisition module 180.

The display device performs user recognition by determining whether the detected human body is the human body of the user by comparing information on the human body acquired through the information acquisition module 180 with pre-stored human body information of the user (403).

When the detected human body is determined to be the human body of a previously registered user, the display device identifies recognition information of the user, identifies content information corresponding to the identified recognition information (404), and determines whether content information corresponding to the identified recognition information is stored (405).

In addition, when the number of users stored in the storage 192 is one, the display device may omit a process of identifying the recognition information.

When it is determined that the content information corresponding to the identified recognition information is stored, the display device performs the first display mode so that the local dimming is performed.

That is, the display device turns on operations of the first light emitting region of the backlight and the first display region of the display panel, turns off operations of the second light emitting region of the backlight and the second display region of the display panel, and thereby displays content information of the recognized user in a portion of the display device (406).

Figure 8:
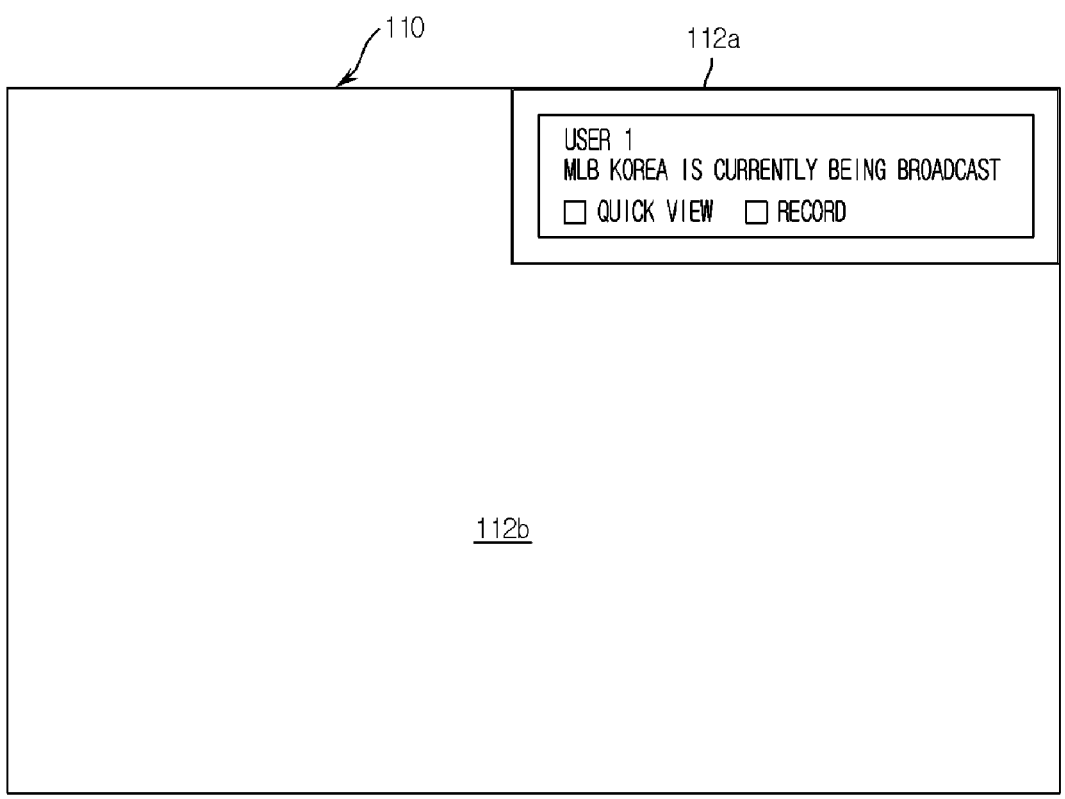
FIGS. 8 and 9 are diagrams illustrating exemplary content information display of a display device according to an exemplary embodiment.

As illustrated in FIG. 8, the display device turns on the light source of the first light emitting region of the backlight, provides light generated from the first light emitting region to the first display region 112*a* of the display panel, simultaneously operates the first display region 112*a*, and thereby displays content information of the user in the first display region 112*a*. At this time, the light source of the second light emitting region of the backlight and the second display region 112b of the display panel maintain an off state.

When it is determined that the content information corresponding to the identified recognition information is not stored, the display device receives information on recommended content to be recommended to the user from a content providing server (407), and performs the first display mode for displaying the received information on recommended content.

That is, the display device turns on operations of the first light emitting region of the backlight and the first display region of the display panel, turns off operations of the second light emitting region of the backlight and the second display region of the display panel, and thereby displays the information on recommended content in a portion of the display device (408).

In addition, when content information that is currently broadcast or to be broadcast within a predetermined time is displayed, the display device displays a quick view button for reproducing content and a record button for recording content. Also, it is possible to further include an exit button for terminating a display operation of a content information window when content information is displayed.

That is, when a human is detected in a standby mode state, the display device outputs content information for providing content information in a portion of the display panel in the form of a pop-up window. Therefore, a viewing intention of the user may be identified indirectly with minimum power and the content information may be provided to the user.

The user may select the quick view button and the record button in the pop-up window through the remote controller, or by a motion or a speech command.

That is, when motion recognition and speech recognition are possible, the display device maintains a power supply for the camera and the microphone in order to receive a user command.

The display device determines whether the user command is input while displaying content information in a portion of the display panel (409). While determining whether the user command is input, it is also determined whether a predetermined time has elapsed from a display time at which the pop-up window is displayed (410).

When it is determined that the user command is not input even after the predetermined time has elapsed, the display device turns off the first light emitting region of the backlight and the first display region of the display panel so that displaying of the pop-up window displayed in the portion of the display device is terminated, and performs the standby mode.

That is, the display device is changed to the standby mode and is supplied with minimum power for receiving a signal of the remote controller and a signal of external broadcasting and external content. Then, power supplied to the display panel and the backlight is blocked.

When it is determined that the user command has been input within the predetermined time, the display device determines whether the input user command is a reproducing command (411). When the input user command is determined as the reproducing command for reproducing content, the display device performs the second display mode.

That is, the display device turns on the light source of the first and second light emitting regions of the backlight, provides light generated from the first and second light emitting regions to the first and second display regions of the display panel, and simultaneously operates the first and second display regions, and thereby the content is reproduced in the first and second display regions which are an entire region of the display panel (412).

The display device determines whether the user command input within the predetermined time is the reproducing command or the record command (413). When the input user command is determined as the record command for recording content, the display device performs recording of the content (414), terminates the first display mode, and performs the standby mode.

That is, the display device turns the first light emitting region of the backlight and the first display region of the display panel off so that displaying of the pop-up window displayed in the portion of the display device is terminated.

When it is determined that the user command input within the predetermined time is not the record command, the display device determines the user command as an exit command and terminates the first display mode. That is, the display device turns off the first light emitting region of the backlight and the first display region of the display panel in order to terminate the first display mode.

Also, when the number of recognized users is plural in user recognition, the display device identifies content information of the plurality of recognized users. When the number of pieces of the identified content information is plural, preset sizes of the first light emitting region of the backlight and the first display region of the display panel may be extended so that the identified content information is displayed in a larger region.

Figure 9:
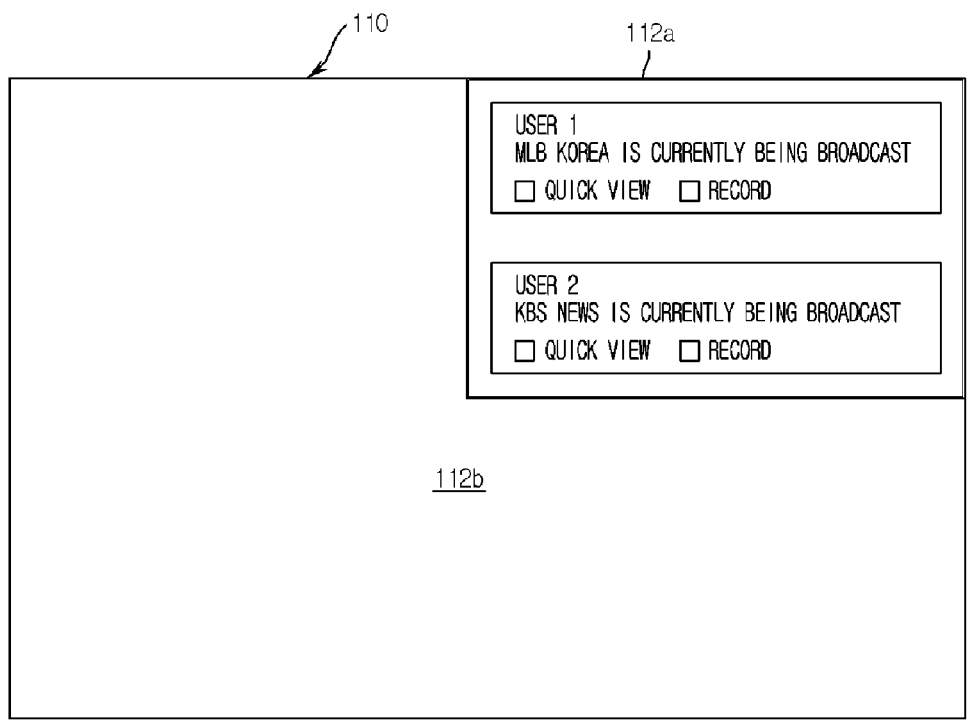

As illustrated in FIG. 9, the display device turns the light source of the extended first light emitting region of the backlight on, provides light generated from the extended first light emitting region to the first display region 112a of the display panel, simultaneously operates the extended first display region 112a, and thereby displays content information of the user in the extended first display region 112a. At this time, the light source of the reduced second light emitting region of the backlight and the reduced second display region 112b of the display panel maintain an off state.

When the preset first light emitting region is B9 and B10 in FIG. 4 or C9 and C10 in FIG. 5, the first light emitting region may be reset to B9, B10, B11, and B12 in FIG. 4 or C9, C10, C11, and C12 in FIG. 5. In this case, the first display region may be set and changed from A9 and A10 to A9, A10, A11, and A12 in FIG. 3.

In addition, when the number of recognized users is plural, the display device determines a user having the highest priority, identifies content information of the user having the highest priority, and displays the identified content information.

Figure 10:
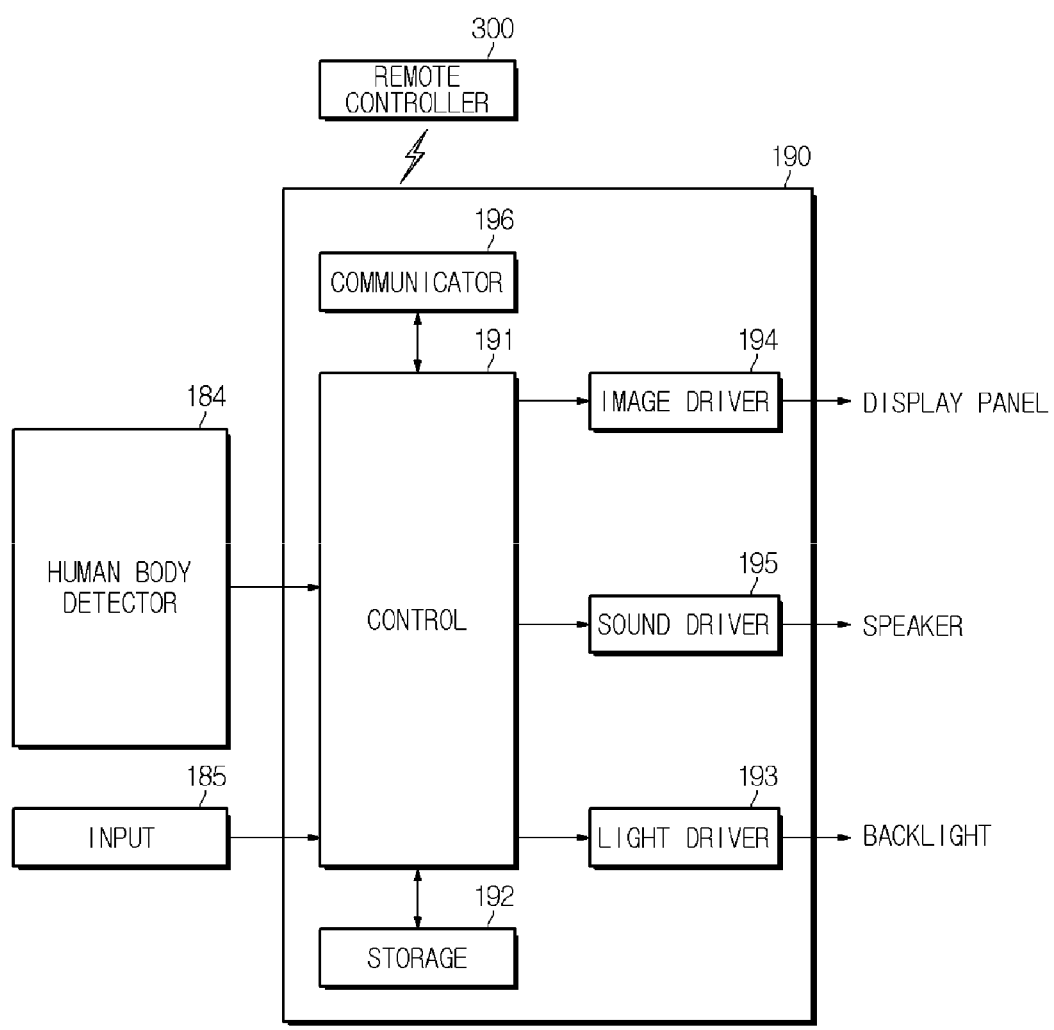
FIG. 10 is a diagram illustrating a control configuration of a display device according to another exemplary embodiment.

FIG. 10 is a diagram illustrating a control configuration of a display device according to another embodiment.

The human body detector 184 detects the human body located around the display device 100.

This human body detector 184 receives power for the operation and performs the operation when the display device is in a standby mode, and stops the operation for detecting the human body when the display device performs a reproduction operation This human body detector 184 includes any from among an infrared sensor, a camera, and a microphone.

The input 185 is provided in the housing of the display device, receives a command from the user through a power button, a channel selection button, a volume selection button, and the like which are electrically connected to the driving module 190, and transmits an input signal to the driving module 190.

When the human body is detected in the standby mode, the driving module 190 drives the image driver and the light driver and performs the first display mode which enables content information to be displayed in the first display region which is a portion of the display panel.

When a content reproducing command is input, the driving module 190 drives the image driver and the light driver, performs the second display mode which enables a content image to be displayed in the display panel, and enables a content sound to be output through a speaker.

This driving module 190 includes the control 191, the storage 192, the light driver 193, the image driver 194, the sound driver 195, and the communicator 196.

When a power on command is input through the input (not illustrated) provided in the display device or the communicator 196, the control 191 controls driving of the display panel 110 and the backlight 120 so that the content is displayed.

When the display device is connected to commercial power and is in a standby mode in which a power button (not illustrated) is turned off, the control 191 controls the operation of the human body detector 184 and determines whether there is a human around the display device based on a signal detected by the human body detector. When it is determined that a human is present, the control 191 turns on operations of the first light emitting region of the backlight and the first display region of the display panel, turns off operations of the second light emitting region of the backlight and the second display region of the display panel, and thereby displays content information in a portion of the display device.

Here, the content information includes information on content that is frequently viewed by the user, information on content that has a high viewing rating, information on content recommended by the public, and the like, and is information on recommended content provided from a content provider.

When a reproducing command is input while content information is displayed in a portion of the display device, the control 191 controls operations of the first and second light emitting regions of the backlight and the first and second display regions of the display panel so that corresponding content is displayed in an entire region of the display device.

When a record command is input while content information is displayed in a portion of the display device, the control 191 performs a recording operation, and performs control such that the first light emitting region of the backlight and the first display region of the display panel are turned off, and thereby the content information displayed in the portion of the display device disappears.

When a predetermined time has elapsed from a time at which the content information is displayed in the portion of the display device, the control 191 performs control such that the first light emitting region of the backlight and the first display region of the display panel are turned off, and thereby the content information displayed in the portion of the display device disappears.

When the number of pieces of content information is plural, the control 191 may extend sizes of the first light emitting region of the backlight and the first display region of the display panel so that the identified content information is displayed in a larger region.

In addition, the control 191 may adjust the sizes of the first light emitting region of the backlight and the first display region of the display panel according to an amount of content information to be displayed.

The storage 192 stores information on content viewed by the user. For example, the storage 192 stores a content name, a channel, a content broadcasting time, the number of times content is viewed, and the like.

In addition, when a user ID is input, the storage 192 may also store content information for each user.

The storage 192 stores location information of the first display region and the location information of the light source disposed in the first light emitting region serving as locations for outputting the content information.

In addition, the locations of the first display region and the first light emitting region for outputting the content information may be changed based on a command of the user.

Since the light driver 193, the image driver 194, the sound driver 195, and the communicator 196 are the same as in the embodiment, descriptions thereof will not be repeated.

Figure 11:
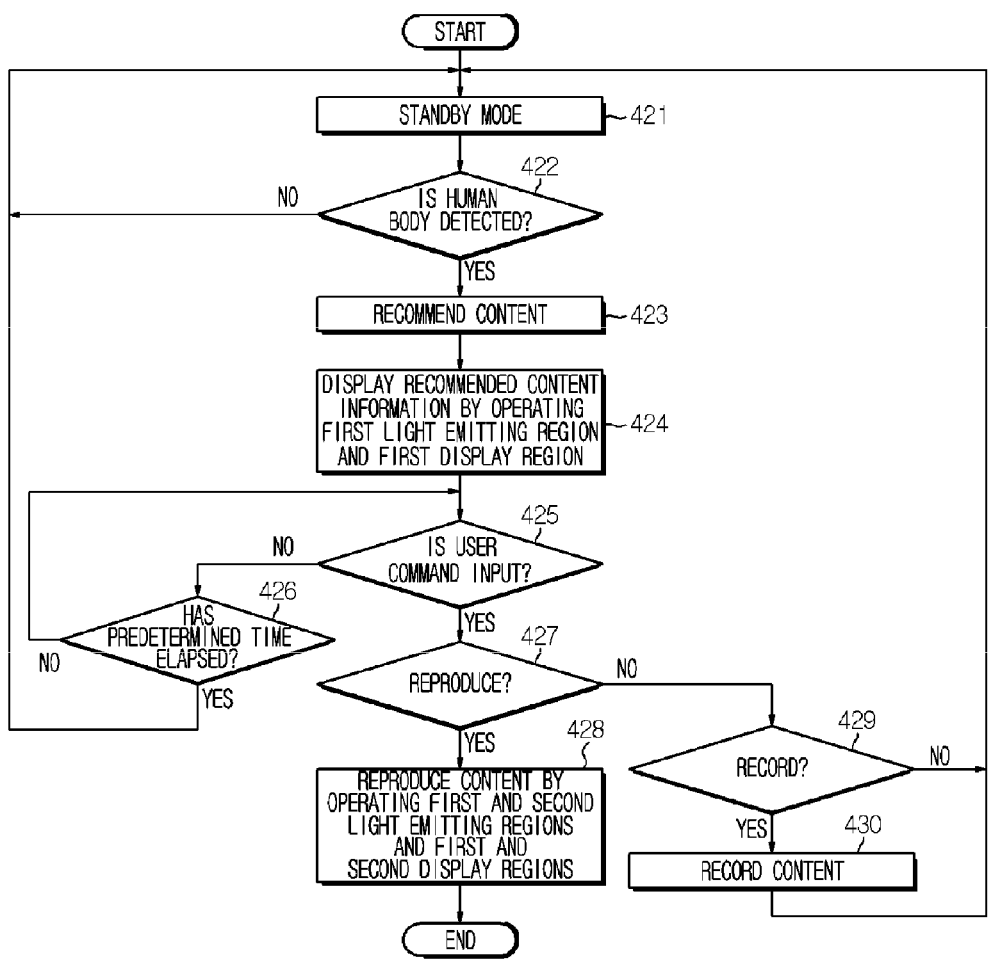
FIG. 11 is a flowchart illustrating control of a display device according to another exemplary embodiment.

FIG. 11 is a flowchart illustrating control of a display device according to another embodiment.

When the user does not view a television serving as the display device, the television serving as the display device maintains a standby mode (421).

Here, the standby mode refers to a state in which the display device is connected to external commercial power and is supplied with power from the commercial power, but is supplied with only minimum power for receiving a signal of the remote controller and a signal of external broadcasting and external content. At this time, the display panel and the backlight are in an off state and are not supplied with power.

The display device supplies power for an operation to the human body detector 184 in the standby mode and controls the operation of the human body detector 184.

The display device determines whether the human body is detected based on the signal detected through the human body detector 184 (422). When it is determined that the human body has been detected, the display device receives a recommendation of content from a content providing server (not illustrated) and performs the first display mode which enables the information on recommended content to be displayed in a portion of the display panel.

In addition, the display device determines whether content information of the user is stored in the storage. When it is determined that the content information is stored, the display device identifies the stored content information and may also display the identified user content information. On the other hand, when it is determined that the content information is not stored, it is also possible to receive a recommendation of content from the content providing server (424).

The first display mode turns on operations of the first light emitting region of the backlight and the first display region of the display panel and turns off operations of the second light emitting region of the backlight and the second display region of the display panel so that content information is displayed in a portion of the display device (424).

In addition, when information on content that is currently being broadcast or to be broadcast within a predetermined time is displayed, the display device displays a quick view button for reproducing content and a record button for recording content. Also, it is possible to further include an exit button for terminating a display operation of a content information window when content information is displayed.

When it is determined that the content information corresponding to the identified recognition information is not stored, the display device receives information on recommended content to be recommended to the user from the content providing server, and performs the first display mode for displaying the received information on recommended content, and thereby the local dimming is performed.

Figure 12:
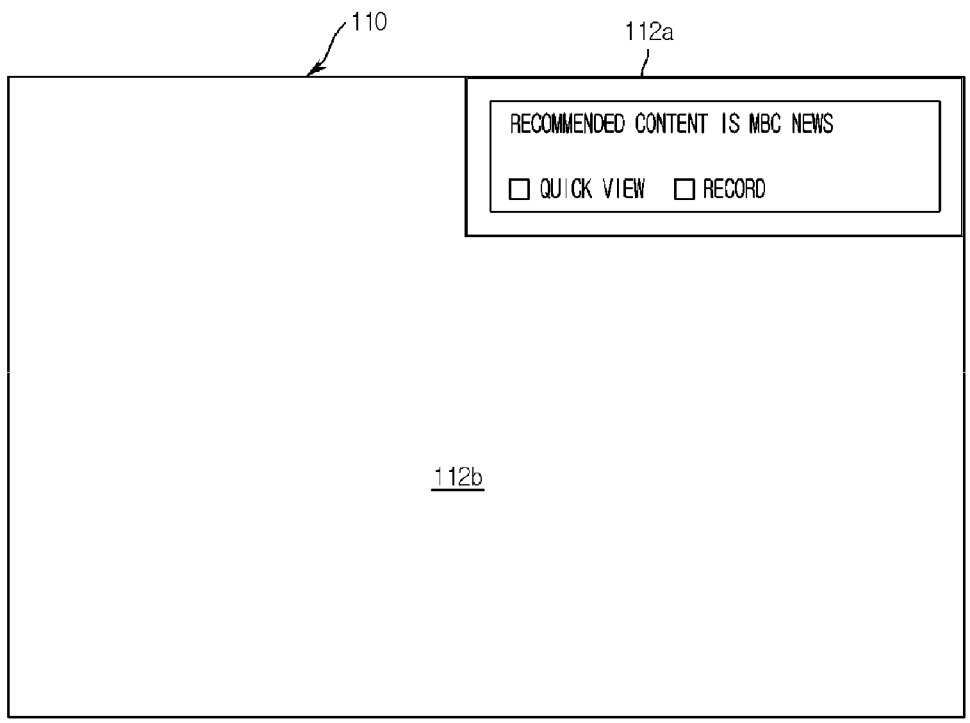
FIG. 12 is a diagram illustrating exemplary content information display of a display device according to another exemplary embodiment.

As illustrated in FIG. 12, the display device turns on the light source of the first light emitting region of the backlight, provides light generated from the first light emitting region to the first display region 112a of the display panel, simultaneously operates the first display region 112a, and thereby displays the information on recommended content in the first display region 112a. At this time, the light source of the second light emitting region of the backlight and the second display region 112b of the display panel maintain an off state.

That is, when a human is detected in a standby mode state, the display device outputs content information for providing content information in a portion of the display panel in the form of a pop-up window. Therefore, a viewing intention of the user may be identified indirectly with minimum power and the content information may be provided to the user.

The user may select the quick view button and the record button in the pop-up window through the remote controller, or a motion or a speech command.

That is, when motion recognition and speech recognition are possible, the display device maintains power supply for the camera and the microphone in order to receive a user command.

The display device determines whether the user command is input while displaying content information in a portion of the display panel (425). While determining whether the user command is input, it is also determined whether a predetermined time has elapsed from a display time at which the pop-up window is displayed (426).

When it is determined that the user command is not input even after the predetermined time has elapsed, the display device turns the first light emitting region of the backlight and the first display region of the display panel off so that displaying of the pop-up window displayed in the portion of the display device is terminated, and performs the standby mode.

That is, the display device is changed to the standby mode and is supplied with minimum power for receiving a signal of the remote controller and a signal of external broadcasting and external content. Then, power supplied to the display panel and the backlight is blocked.

When it is determined that the user command has been input within the predetermined time, the display device determines whether the input user command is a reproducing command (427). When the input user command is determined as the reproducing command for reproducing content, the display device performs the second display mode.

That is, the display device turns on the light source of the first and second light emitting regions of the backlight, provides light generated from the first and second light emitting regions to the first and second display regions of the display panel, and simultaneously operates the first and second display regions, and thereby the content is reproduced in the first and second display regions which are an entire region of the display panel (428).

The display device determines whether the user command input within the predetermined time is the reproducing command or the record command (429). When the input user command is determined as the record command for recording content, the display device performs recording of the content (430) and terminates the first display mode. At this time, the display device performs the standby mode.

That is, the display device turns off the first light emitting region of the backlight and the first display region of the display panel so that displaying of the pop-up window displayed in the portion of the display device is terminated.

When it is determined that the user command input within the predetermined time is not the record command, the display device determines the user command as an exit command. The display device turns off the first light emitting region of the backlight and the first display region of the display panel so that displaying of the pop-up window displayed in the portion of the display device is terminated.

In addition, when content information stored in the storage is identified and the number of pieces of the stored content information is plural, the display device may extend preset sizes of the first light emitting region of the backlight and the first display region of the display panel so that the identified content information is displayed in a larger region.

In this manner, for the user who views the display device, the local dimming is performed on the backlight which provides information on content desired by the user utilizing only a portion of the display device. Therefore, it is possible to increase dynamic contrast and reduce power consumption more efficiently than in global dimming.

Accordingly, the user may easily enter a personalized mode of a TV, and information on content is provided to the user in the standby mode so that viewers are attracted to the television, which results in an increase in time spent viewing the television.

What is claimed is:

1. A display device, comprising:
an input configured to receive a user command;
a display panel including a first display region and a second display region that is a region other than the first display region;
a backlight including a first light emitting region in which some light sources out of a plurality of light sources are located and which is a region corresponding to the first display region of the display panel and a second light emitting region in which a remainder of light sources of the plurality of light sources are located, and which is a region corresponding to the second display region of the display panel, and configured to apply light to the display panel;
a human body detector configured to detect a human body located around the display panel;
a human body information acquisition unit configured to acquire information on the human body; and
a control configured to:
control an operation of the human body information acquisition unit when the human body is detected in a standby mode;
perform user recognition based on the acquired human body information;
perform a first display mode such that content information of a recognized user is displayed in the first display region of the display panel when it is determined that the notification information of the recognized user is stored in a storage;
perform the first display mode such that recommended content is displayed in the first display region of the display panel when it is determined that the content information of the recognized user is not stored in the storage:
perform a second display mode when a reproducing command is input while the first display mode is performed; and terminate the first display mode and perform recording of a content when a record command is input while the first display mode is performed;

wherein the first display mode turns on operations of the first light emitting region of the backlight and the first display region of the display panel; and turns off operations of the second light emitting region of the backlight and the second display region of the display panel;

the second display mode turns on operations of the first light emitting region of the backlight and the first display region of the display panel and turns on operations of the second light emitting region of the backlight and the second display region of the display panel so that the content is reproduced in an entire region of the display device; and wherein the control is configured to adjust sizes of the first display region and sizes of the first light emitting region based on a number of recognized users and, a number of the content information when the first display mode is performed, and wherein the control is configured to reduce power consumption of the display device through backlight control of ON and OFF light source regions.

2. The display device according to claim 1, wherein the human body detector includes at least one from among an infrared sensor, a camera, and a microphone.

3. The display device according to claim 1, wherein the storage is configured to store at least one piece of user recognition information and content information corresponding to the at least one piece of user recognition information, wherein the control is configured to recognize the user by comparing the acquired human B body information with the user recognition information, identify whether content information of the recognized user is stored when the human body is determined as a human body of a previously registered user.

4. The display device according to claim 1, wherein, when the content information of the user is displayed, the control controls a power supply for some light sources of the first light emitting region and inhibits power supplied to the light sources of the second light emitting region.

5. The display device according to claim 1, wherein the content information of the user includes information of the content viewed at a predetermined viewing ratio or more by the user, and wherein the control turns off the light sources, which was previously turned on, such that displaying of the content information is terminated when a predetermined time has elapsed from a time at which the content information is displayed.

6. The display device according to claim 5, further comprising
a communicator configured to receive a user command input to an external remote controller.

7. The display device according to claim 5, wherein the control recognizes a motion in the acquired human body information and recognizes a user command based on the recognized motion.

8. The display device according to claim 5, wherein the control recognizes speech in the acquired human body information and recognizes a user command based on the recognized speech.

9. The display device according to claim 1, wherein, when a number of recognized users is plural, the control identifies content information of the recognized users and controls displaying of the identified content information.

10. The display device according to claim 1, wherein, when a number of recognized users is plural, the control determines a user having a highest priority among the plurality of users, identifies content information of a determined user, and controls displaying of the identified content information.

11. A display device, comprising:
an input configured to receive a user command;
a display panel including a first display region and a second display region that is a region other than the first display region;
a backlight including a first light emitting region in which some light sources out of a plurality of light sources are located and which is a region corresponding to the first display region of the display panel and a second light emitting region in which a remainder of light sources of the plurality of light sources are located and which is a region corresponding to the second display region of the display panel, and configured to apply light to the display panel;
a human body detector configured to detect a human body; and
a control configured to:
identify whether user content information is stored in content storage when it is determined that the human body is detected in a standby mode;
perform a first display mode such that the user content information is displayed in the first display region of the display panel when it is determined that the user content information is stored in the storage; perform the first display mode such that recommended content is displayed in the first display region of the display panel when it is determined that the user content information is not stored in the storage;
perform a second display mode when a reproducing command is input while the first display mode is performed; and
terminate the first display mode and perform recording when a record command is input while the first display mode is performed, wherein the first display mode turns on operations of the first light emitting region of the backlight and the first display region of the display panel and turns off operations of the second light emitting region of the backlight and the second display region of the display panel so that the user content information is displayed in a portion of the display device, the second display mode turns on operations of the first light emitting region of the backlight and the first display region of the display panel and turns on operations of the second light emitting region of the backlight and the second display region of the display panel so that a content is reproduced in an entire region of the display device, and wherein the control is configured to adjust sizes of the first display region and sizes of the first light emitting region based on a number of users and a number of the content notification information when the first display mode is performed, and wherein the control is configured to reduce power consumption of the display device through backlight control of ON and OFF light source regions.

12. The display device according to claim 11,
wherein the content information of the user includes information of a content viewed at a predetermined viewing ratio or more by the user, and
wherein, when a predetermined time has elapsed from a time at which the content information is displayed, the control turns off the light source of the first light emitting region such that displaying of the content information is terminated.

13. A method of reducing power consumption of a display device through backlight control of ON and OFF light source regions, the display device including a display panel and a backlight for providing light to the display panel, the method comprising:
performing an operation of detecting a human body using a human body detector in a standby mode;
controlling an operation of a human body information acquisition unit when the human body is detected;
performing user recognition based on the acquired human body information;
identifying a number of a recognized users based on the acquired human body information;
performing a first display mode for displaying content information of a user when the user is recognized;
performing a second display mode for displaying content when a reproducing command is input while the first display mode is performed; and
terminating the first display mode and performing recording of the content when a record command is input while the first display mode is performed,
wherein the first display mode turns on operations of a first light emitting region of the backlight and a first display region of the display panel and turns off operations of a second light emitting region of the backlight and a second display region of the display panel so that the content information is displayed in a portion of the display device, and
the second display mode turns on operations of the first light emitting region of the backlight and the first display region of the display panel and turns on operations of the second light emitting region of the backlight and the second display region of the display panel so that a content is reproduced in an entire region of the display device,
wherein the performing the first display mode includes: displaying content information of the recognized user in the first display region of the display panel when it is determined that the content information of the recognized user is stored in a storage, and displaying recommended content in the first display region of the display panel when it is determined that the content information of the recognized user is not stored in the storage,
wherein the performing the first display mode includes: adjusting sizes of the first display region and sizes of the first light emitting region based on a number users and, a number of the content information and a number of pieces of the recommended.

14. The method according to claim 13,
wherein the performing of the user recognition includes acquiring an image of the human body and recognizing the user based on the acquired image.

15. The method according to claim 13,
wherein the performing of the user recognition includes collecting speech of the human body and performing user recognition based on speech recognition of the collected speech.

16. The method according to claim 13,
wherein the displaying of the content information includes:
recognizing a user by comparing the acquired human body information with pre-stored user recognition information; and
identifying whether content information of the recognized user is stored when the human body is determined as a human body of a previously registered user.

17. The method according to claim 16, further comprising
when it is determined that content information of the recognized user is not stored in the storage, receiving a recommendation of content from a content providing server and
displaying information of recommended content.

18. The method according to claim 13, further comprising
when a predetermined time has elapsed from a time at which the content information is displayed, turning off the light sources of the backlight, which was previously turned on, such that displaying of the content information is terminated.

* * * * *